(12) United States Patent
Lubatschowski et al.

(10) Patent No.: US 6,787,733 B2
(45) Date of Patent: Sep. 7, 2004

(54) LASER MACHINING OF MATERIALS

(75) Inventors: Holger Lubatschowski, Gehrden (DE); Alexander Heisterkamp, Hannover (DE); Gero Maatz, Müunchen (DE)

(73) Assignee: Laser Zentrum Hannover e.V. (DE)

( * ) Notice: Subject to any disclaimer, the term of this patent is extended or adjusted under 35 U.S.C. 154(b) by 5 days.

(21) Appl. No.: 10/258,786

(22) PCT Filed: Apr. 25, 2001

(86) PCT No.: PCT/EP01/04629

§ 371 (c)(1),
(2), (4) Date: Oct. 28, 2002

(87) PCT Pub. No.: WO01/83155

PCT Pub. Date: Nov. 8, 2001

(65) Prior Publication Data

US 2003/0110862 A1 Jun. 19, 2003

(51) Int. Cl.⁷ .............................................. B23K 26/03
(52) U.S. Cl. ............................. 219/121.67; 219/121.72
(58) Field of Search ........................ 219/121.6, 121.61, 219/121.62, 121.67, 121.72, 121.83, 121.85; 73/644

(56) References Cited

U.S. PATENT DOCUMENTS 6,004,314 A * 12/1999 Wei et al. ..................... 606/12
6,559,413 B1 * 5/2003 Muenchausen et al. 219/121.72
6,621,040 B1 * 9/2003 Perry et al. ............ 219/121.67

* cited by examiner

Primary Examiner—Samuel M. Heinrich
(74) Attorney, Agent, or Firm—Pendorf & Cutliff

(57) ABSTRACT

A device for machining a material with ultrashort laser pulses is described. This device comprises:

(a) a device (1) for generating a sequence of first laser pulses, where
   the first laser pulses each have a duration of less than 300 picoseconds and
   the repetition rate for the first laser pulses is in the range between 100 kHz and 1 GHz, (b) a converter (2) for converting a first set of the sequence of first laser pulses into a sequence of second laser pulses for application to and for machining of the material, where
   the second laser pulses each have a duration of less than 300 picoseconds and
   the repetition rate for the second laser pulses is in the range between 1 Hz and 1 MHz, as well as (c) a testing device (3, 5, 6, 7, 15) that is equipped to apply first laser pulses, which do not belong to the first set, to the material, to detect specific results of this application and to provide these detected results as information.

9 Claims, 2 Drawing Sheets

LASER MACHINING OF MATERIALS

CROSS REFERENCE TO RELATED APPLICATION

This application is a national stage of PCT/EP01/04629 filed Apr. 25, 2001 and based upon DE 100 20 559.3 filed Apr. 27, 2000 under the International Convention.

BACKGROUND OF THE INVENTION

1. Field of the Invention

The present invention relates to a device and a method for laser machining of materials such as, for example, metallic materials (metals, alloys), ceramics, glasses, plastics, cellulose materials (paper, board, etc.), biological tissues, fluids.

2. Description of the Related Art

The use of ultrashort laser pulses, i.e. pulses with a pulse duration in the range between approximately $10^{-15}$ s and $5 \times 10^{-10}$ s for the purpose of high precision laser microstructuring is known.

Thus, C. Momma et al. describe experiments on laser ablation of metallic materials using pulse durations of 150 fs down to the nanosecond range in "Präzise Mikro-Bearbeitung mit Femtosekunden-Laserpulsen/Precise Micromachining with Femtosecond Laser Pulses", Laser- und Opto-elektronik 29(3)/1997.

S. Nolte discusses aspects of material machining using femtosecond laser pulses in his thesis on "Mikromaterialbearbeitung mit ultrakurzen Laserpulsen, (Micromachining of materials with ultrashort laser pulses)", Cuvillier Verlag G öttingen, 1999.

In an article on "Application of ultrashort laser pulses for intrastromal refractive surgery", Graefe's Arch. Clin. Exp. Ophthalmol 238:33–39, 2000, H. Lubatschowski et al. describe the use of laser systems which generate ultrashort laser pulses with a duration of 100–200 femtoseconds in the field of intrastromal refractive surgery.

Kurtz et al. "Optimal Laser Parameters for Intrastromal Corneal Surgery", SPIE, Vol. 3255, 56–66, January 1998, also use ultrashort laser pulses for tissue machining.

Loesel et al., "Non-thermal ablation of neutral tissue with femtosecond laser pulses", Appl Phys. B, 66, 121–8, 1998, are also concerned with comparable objectives.

In WO 99/67048 Michael D. Perry and Brent C. Stuart describe methods for "Ultrashort Pulse Laser Machining of Metals and Alloys". In this publication they explain the use of laser pulses with a repetition rate that is greater than 1 Hz and can even be more than 2 kHz, the laser beams having a wavelength in the range between 0.18 and 10 $\mu$m and the pulse duration being between 10 fs and 100 ps; values in excess of $10^{12}$ W/cm$^2$ are quoted for the intensity (=power density).

Usually, femtosecond pulses with sufficient energy (in the $\mu$J to mJ range) for material machining are generated during so-called "chirped pulse" amplification. In this context see D. Strickland, G. Mourou, Opt. Commun. 56. 219 (1985) and WO 99/67048. With this amplification technique pulses with a duration of, for example, about 100 fs are first generated in a mode-coupled oscillator. The pulses are initially temporally stretched. This takes place in a structural unit termed a "stretcher", which comprises a special arrangement of dispersion gratings and has the effect that the various wavelength fractions of the pulse (the bandwidth of a 100 fs pulse is approximately 10 mm for an average wavelength of 800 nm) travel optical paths of different lengths. The pulse is reversibly stretched by more than three orders of magnitude from 100 fs to a few 100 ps. Because of the reduction in intensity produced in this way, the subsequent amplification takes place with avoidance of non-linear effects, which would result in interference with the spatial pulse profile and could lead to destruction of the amplifier medium. The amplified pulse is then compressed again to virtually its original duration by a structural element termed a "compressor", which likewise consists of dispersion gratings.

A typical mode-coupled oscillator for the generation of fs laser pulse (sic) is indicated by C. Momma et al., Laserunder Optoelektronik 29(3)/1997, p. 85 with reference to F. Salin et al., Opt. Lett. 16.1674 (1991).

For their experiments H. Lubatschowski et al., Graefe's Arch. Clin. Exp. Ophthalmol 238:33–39, 2000, use a "Kerr lens" mode-coupled titanium-sapphire laser system with subsequent "chirped pulse" amplification and to this extent refer to Morou G (1997) "The ultra high-peak power laser: present and future" Appl. Phys. B 65:205–211.

Further systems for defined generation of ultrashort laser pulses (fs laser pulses) are known to those skilled in the art from the pertinent literature.

The explanations on equipment and methods for the production of ultrashort laser pulses and on their use in material machining given in the literature references cited above are incorporated in the present text by reference. Laser systems of the type mentioned in the literature references cited above can be used in the context of the present invention.

In general, i.e. also in the context in the present invention, ultrashort laser pulses can be used for cutting material (for example metallic materials), for ablation and structuring of material (for example biological tissue) and for changing material properties (for example changing the refractive index in glass).

The particular advantages of material machining with ultrashort laser pulses (fs laser pulses) are evident in particular in extremely precise cutting and/or ablation of materials that gives rise to minimal damage, both thermally and mechanically. By focusing the ultrashort laser pulses, energy is deposited in the focus on a very restricted area by striking a microplasma and a cutting effect or material ablation is achieved by so-called photodisruption. Ablation rates in the sub-$\mu$m range with cut widths of less than 500 nm can be achieved. Because of a non-linear interaction mechanism during photodisruption, the material ablation with this technique is largely independent of the material properties. In particular, materials with high thermal conductivity (such as, for example, metals) and materials with low laser light absorption (such as, for example, polymers or certain biological tissues) can also be machined using fs laser pulses.

As an alternative to ablation on the surface of a material to be treated, it is also possible by focusing in materials that are transparent to laser radiation (such as, for example, the cornea of an eye) to achieve a cutting effect within the transparent material (tissue).

However, to date the use of the fs laser pulse technique for machining materials has been fairly inconvenient. For instance, up to now no suitable means are available for online monitoring of the machining result. As a general rule, therefore, in the case of fs material machining the machining result, for example a cut depth achieved, is currently determined, for example by optical or electron microscopy, only after machining. If post-machining of the material is required, the material sample must be re-positioned, which, however, as a general rule is no longer possible with the precision desired or even required. Therefore, frequently the ablation depth per pulse is initially determined by semi-empirical means and the cut depth in the sample to be machined is then estimated prospectively by counting the laser pulses. This procedure is increasingly being felt to be unsatisfactory.

SUMMARY OF THE INVENTION

The aim of the present invention was, therefore, to indicate a device and a method for laser machining of a material, for example in the solid or liquid aggregate state, with ultrashort laser pulses, which device and which method make it possible by simple means to monitor the result of machining with ultrashort laser pulses.

Preferably, in this context the device and the method should be so designed that online monitoring is possible.

According to a first aspect of the present invention, the stated aim is achieved by a device for machining a material with ultrashort laser pulses, comprising (a) a device for generating a sequence of first laser pulses, where
   the first laser pulses each have a duration of less than 300 picoseconds and
   the repetition rate for the first laser pulses is in the range between 100 kHz and 1 GHz, (b) a converter for converting a first set of the sequence of first laser pulses into a sequence of second laser pulses for application to and for machining of the material, where
   the second laser pulses each have a duration of less than 300 picoseconds and
   the repetition rate for the second laser pulses is in the range between 1 Hz and 1 MHz, as well as.

(c) a testing device that is equipped to apply first laser pulses, which do not belong to the first set, to the material, to detect specific results of this application and to provide these detected results as information.

According to a second aspect of the present invention the stated aim is achieved by a method for machining a material with ultrashort laser pulses, having the following steps:.

(a) generation of a sequence of first laser pulses, where
   the first laser pulses each have a duration of less than 300 picoseconds and
   the repetition rate for the first laser pulses is in the range between 100 kHz and 1 GHz, (b) conversion of a set of first laser pulses into a sequence of second laser pulses for machining the material, where.
   the second laser pulses each have a duration of less than 300 picoseconds and
   the pulse repetition rate is in the range between 1 Hz and 1 MHz, (c) application of a sequence of selected second laser pulses to the material in order to machine this, (d) application of a second set of first laser pulses to the material in order to test this.

The invention is based on the surprising finding that laser systems for fs material machining which use the chirped pulse amplification technique and have corresponding laser pulse converters emit a multiplicity of non-amplified pulses (termed "first pulses" above) in the period between each two successive amplified pulses (termed "second pulses" above), which non-amplified pulses have, as superfluous ballast, hitherto not been considered further, but are exceptionally suitable for use for testing the material to be machined.

The non-amplified (first) laser pulses as a rule have a repetition rate that is several orders of magnitude higher than that of the amplified (second) laser pulses. Whilst the repetition rate of the non-amplified pulses is typically in the MHz range, the repetition rate of the amplified (second) pulses will in most cases be in the kHz range.

Whilst the pulse energy of the non-amplified (first) laser pulses is usually in the range of 1 pJ–100 nJ, the pulse energy of amplified (second) laser pulses is as a rule in the range between 1 $\mu$J and 100 mJ. For material machining the intensity of the second laser pulses is as a rule set at a value that is higher than $10^{10}$ W/cm$^2$.

According to the invention the non-amplified first laser pulses each have a duration of less than 300 picoseconds, preferably between 10 femtoseconds and 300 picoseconds. Pulse durations of less than 10 femtoseconds cannot easily be obtained at present, but would be usable for the purposes of the invention. Longer pulse durations lead to an impairment of the machining result and as a rule do not permit good local resolution when testing. The short coherence lengths of the preferred non-amplified (first) laser pulses, on the other hand, allow resolutions which essentially corresponds (sic) to the ablation depth when removing material by means of amplified (second) pulses of the same length. They therefore allow optimum online monitoring of machining.

In preferred embodiments of the device according to the invention the converter comprises a selective pulse amplifier, such as, for example, a regenerative amplifier, for example in the form of a chirped pulse amplifier, in which only a small fraction of the first pulses is (highly) amplified. The amplified and the non-amplified oscillator pulses then as a rule pass in the same way to the output of the amplifier system and are directed onto the material to be machined and to be tested.

The amplified (second) laser pulses, which issue from the amplifier system with a distinctly lower repetition rate than the non-amplified (first) laser pulses, contribute to material machining (for example to material ablation).

The radiation of the non-amplified (first) laser pulses in the material to be machined is, on the other hand, partially absorbed and partially reflected, a proportion being reflected back in the direction opposed to the radiation direction. The non-amplified laser pulses do not contribute or do not substantially contribute to material machining.

Preferably, the testing device according to the invention comprises a detector that is so arranged and equipped that the information it provides on the result of the application of the first laser pulses is a response to the radiation reflected by the material, advantageously the radiation reflected in the direction opposed to the irradiation direction. With this arrangement the information provided by the detector changes with the signal from the reflected and detected light, that is to say in particular as a function of the optical properties of the material to be machined or already machined.

The evaluation of the information provided can be carried out in a manner known to those skilled in the art.

Whilst the non-amplified laser pulse fractions, which are partially reflected back in the radiation direction, can thus be used for the purposes of testing, the (likewise partially reflected) amplified (second) laser pulses are regularly masked by a pulse selector, for example acousto-optically, electronically or in some other way, in particular in order to prevent overdrive of the (photo-)detector.

With this arrangement testing of the material can take place on line (i.e. temporally embedded in the material machining process) or offline (before and/or after material machining).

According to a further preferred embodiment of the device according to the invention (d) a control and/or regulating device is provided as a further relevant structural element, in addition to the structural elements (a)–(c), which control and/or regulating device interacts both with the testing device and with the converter, information being transmitted from the testing device to the control and/or regulating device and the control and/or regulating device controlling or regulating the conversion of first laser pulses into second laser pulses and/or the application of the second laser pulses to the material as a function of this information.

In the context of control of the conversion of first laser pulses into second laser pulses, it is possible, in particular, to control the amplification factor, that is to say the energy of the second laser pulses.

A switching device can be provided as an alternative or in addition, in order manually or automatically to stop or to prevent the conversion (amplification) of first laser pulses into second laser pulses before, after or during material machining (for example after a specific machining result has been achieved or in the event of deviation from specific operating parameters).

The material or the progress of material machining can be tested or determined, for example, by time-of-flight measurements.

However, the preferred form of material testing is interferometric testing, such as is known, for example, from optical coherence tomography (OCT). Interferometric tests and corresponding testing devices are suitable, in particular, for online material testing. (a) Linking the OCT technique with imaging methods for visualisation of the material area to be machined or already machined and (b) use of the OCT results for controlling material machining is particularly preferred.

A preferred device according to the invention comprises an OCT device and a laser system, for material machining with ultrashort laser pulses, in an integrated construction. As also explained in more detail below with reference to the figures, the term "integrated construction" in this context signifies that essential structural elements of the preferred device according to the invention, including the device for generating the sequence of first laser pulses (the fs oscillator system), are used both for carrying out the OCT and for material machining. Compared with a separate construction, the preferred device is therefore very compact and because of the small number of structural elements there is a considerable saving in costs.

The preferred wavelengths (frequencies) for laser radiation used in the context of the present invention are in the visible (VIS) or near infrared (NIR) range because the optical systems that can be used and the devices for pulse generation for this are comparatively inexpensive.

A preferred device according to the invention of integrated construction is explained below, structural variations not being precluded in the individual case.

A preferred device according to the invention comprises an fs oscillator system for generating the sequence of first laser pulses. The radiation (first laser pulses) generated in this oscillator system is fed to a regenerative amplifier, in which a fraction of the first laser pulses is highly amplified in a predetermined manner.

(a) Non-amplified (first) pulses with a high repetition frequency (for example in the range of several MHz) and interrupting the sequence of first pulses.

(b) amplified (second) pulses with a predetermined lower pulse frequency (for example in the range of a few kHz) then issue from the output of the amplifier.

The first and second laser pulses issuing from the amplifier are advantageously separated into two beams by means of a beam divider/coupler in order to enable interferometric analysis (OCT).

The laser pulses of the one (sub-)beam (hereinafter also: reference pulses) are—as is customary in OCT devices—radiated into a reference arm in which they impinge on a reference mirror.

The corresponding laser pulses of the second (sub-)beam (hereinafter also: target pulses) are directed onto the material to be tested (the target).

Parts of the reference pulses and target pulses are reflected back from the reference mirror inside the reference arm and, respectively, from the surface of the material to be tested and are superimposed in the beam divider/coupler.

After issuing from the beam divider/coupler, the superimposed non-amplified pulses (non-amplified reference pulses and target pulses) are fed to a photodetector in which the interference of the superimposed non-amplified pulses can be detected as a periodic variation in the detector signal, for example if the reference mirror is moved at essentially constant speed.

After issuing from the beam divider/coupler, the superimposed amplified laser pulses, on the other hand, are eliminated by means of a pulse selector (chopper, AOM, EOM or the like), in order to preclude overdrive of the detector.

The detector signal from the photodetector can be demodulated by a demodulator, the demodulated signal can be converted into a digital signal by means of an A/D converter and this digital signal, in turn, fed to a computer (an evaluation unit) for the purposes of OCT analysis. Imaging methods can be integrated in the evaluation procedure in a manner that is customary per se.

The scanning or positioning technology known from the field of fs micro-machining of material can also be used in the context of the present invention for scanning the material when carrying out OCT material testing (the interferometric analysis).

It is known to those skilled in the art that the interference signal disappears as soon as the optical wavelength difference between the radiation reflected from the material and the radiation reflected from the reference mirror becomes greater than the coherence length of the radiation source for the first laser pulses.

When the OCT technique is used the non-amplified (first) laser pulses penetrate partially into the material to be machined or already machined and are reflected from lower lying material layers which differ in their reflectivity. (Spatial) material testing in three dimensions is therefore possible by scanning the material. The three-dimensional material information can be used for controlling the fs micromachining of material. For instance, when cutting material it is possible, for example, already to determine the remaining material thickness (still to be ablated) shortly before the actual material separation of the material. The energy of the second (amplified) laser pulses can be adjusted on the basis of these findings and other subsequent steps can be initiated.

The preferred construction indicated above for the OCT device that can be integrated in the device according to the invention largely corresponds to the conventional construction of OCT devices. The person skilled in the art will adapt the design to the particular requirements in the individual case.

In the context of the present invention it is particularly important that the device for generating the sequence of first laser pulses (for example the fs oscillator system) can be regarded both as a component of the integrated OCT device and as a component of the integrated laser material machining device.

As can already be seen from the above explanations with regard to a preferred embodiment of the device according to the invention, in the context of the present invention parts of the device for interferometric (OCT) testing of the material are usually integrated in the beam path of the optical system which applies the second laser pulses to the material to be machined. Online monitoring and, if necessary, control of the machining progress is possible in this way.

The use of optical coherence tomography (OCT) has already been tested in further areas of medicine, for example in the context of determination of the eyeball length by Drexler W., Findl O., Schmetterer L., Hitzenberger C. K., Fercher A. F. "Eye elongation during accommodation in humans: differences between emmetropes and myopes" Invest Ophthalmol Vis Sci. October 1998; 39(11):2140–7 or in connection with the investigation of deposits in coronary vessels by Brezinski M. E., Fujimoto J. G. "Optical Coherence Tomography: High-Resolution Imaging in Nontransparent Tissue" IEEE, Journal of sel. top. in Quantum Electronics, Vol.5, No.4, July/August 1999, 1185–92, and Fujimoto J. G., Boppart S. A., Tearney G. J., Bourna B. E., Pitris C., Brezinski M. E. "High resolution in vivo intra-arterial imaging with optical coherence tomography" Heart August 1999; 82(2): 128–33.

U.S. Pat. No. 6,004,314 discloses "optical coherence tomography assisted surgical apparatus". A system is also described which, in addition to an OCT device, comprises a treatment laser that can be used for photoablation. OCT device and treatment laser interact with a control computer in such a way that results from the OCT analysis are used to control the operation of the treatment laser. However, the treatment laser does not operate with ultrashort laser pulses and the treatment laser radiation is also not generated by the same laser source as the laser radiation used for carrying out the OCT.

Although the device disclosed in U.S. Pat. No. 6,004,314 is thus for several reasons not comparable with the device according to the invention, the method and devices for carrying out the optical coherence tomography disclosed in U.S. Pat. No. 6,004,314 can nevertheless also be used in the context of the present invention. The corresponding statements in U.S. Pat. No. 6,004,314 are incorporated in the present text by way of reference.

OCT devices which can also be used in the context of the present invention when using a source for ultrashort laser pulses are described in EP 0 956 809 A1.

Equipment and methods for generating ultrashort optical pulses are described in DE 199 04 565 A1. It is pointed out that pulses in the range of 1–10 nJ and higher can be obtained both directly and also by means of chirped pulse amplification. The use of specific equipment and methods in the field of optical coherence tomography (OCT) is explained.

EP 0 956 809 A1 and DE 199 04 565 A1 are also incorporated in the present text by reference insofar as they relate to methods and devices for carrying out optical coherence tomography with ultrashort laser pulses.

BRIEF DESCRIPTION OF THE DRAWINGS

Further preferred embodiments of the device according to the invention are apparent from the dependent claims and the appended figures.

DETAILED DESCRIPTION OF THE INVENTION

Figure 1:
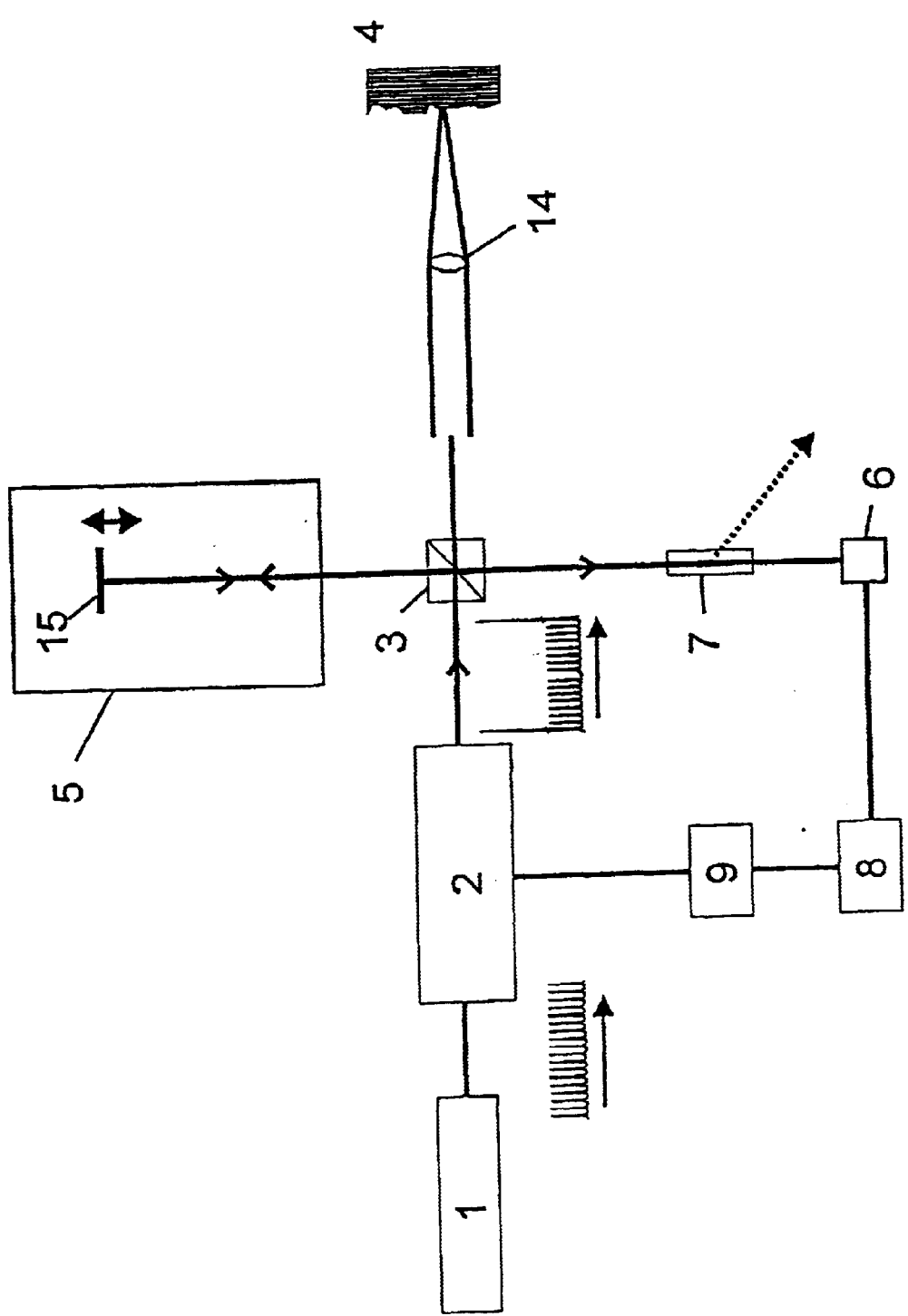
FIG. 1 shows the principle of the overall construction of a device according to the invention in an integrated construction and FIG. 2 shows the procedure for an fs laser system with regenerative amplifier.

The device for machining a material with ultrashort laser pulses shown in FIG. 1 comprises an fs oscillator 1 as the device for generating a sequence of first laser pulses. First laser pulses with a duration of between 10 femtoseconds and 300 picoseconds and a repetition rate in the range between 100 kHz and 1 GHz are generated in this fs oscillator. The energy of the first laser pulses is approximately in the range between 100 pJ and 10 nJ in this case.

The radiation of first laser pulses generated in the fs oscillator 1 is fed to a selective pulse amplifier 2, in which a fraction of the first laser pulses is highly amplified, and thus converted into second laser pulses, in a predetermined manner.

(a) Non-amplified (first) pulses with a high repetition frequency (for example in the range of several MHz) and
interrupting the sequence of first pulses
(b) amplified (second) pulses with a predetermined lower pulse frequency (for example in the range of a few kHz).
issue at the output of the amplifier 2.

The first and second laser pulses issuing from the amplifier 2 are separated into two beams by means of a beam divider/coupler 3.

The laser pulses of a first of the two beams (reference pulses) are—as is customary in OCT devices—irradiated into a reference arm 5 in which they impinge on a reference mirror 15 that can be moved to and fro in a defined manner in the radiation direction.

The laser pulses of the second beam (hereinafter also: target pulses) are directed onto the material 4 to be tested (the target, merely indicated in FIG. 1). A focusing optical imaging system 14 is used here that is so equipped that non-linear absorption and thus material ablation occurs only in the case of the highly amplified (second) pulses. The non-amplified pulses essentially do not effect any change in the material.

Parts of the reference pulses and target pulses are reflected back from the reference mirror 15 inside the reference arm 5 and, respectively, from the surface of the material 4 to be tested and are superimposed in the beam divider/coupler 3.

After issuing from the beam divider/coupler 3, the superimposed non-amplified pulses (non-amplified reference pulses and target pulses) are fed to a photodetector 6, in which the interference of the superimposed non-amplified pulses can be detected as a periodic variation in the detector signal if the reference mirror 15 is moved at essentially constant speed.

The superimposed amplified laser pulses, on the other hand, are eliminated by means of a chopper 7 after issuing from the beam divider/coupler 3, in order to preclude overdrive of the detector 6.

The detector signal from the photodetector 6 is fed to an evaluation device 8, where it is evaluated interferometrically in the conventional manner and (further) processed using imaging methods.

The evaluation device 8 is connected to a control device 9 which controls the operation of the selective amplifier 2 as a function of the result of the evaluation.

Figure 2:
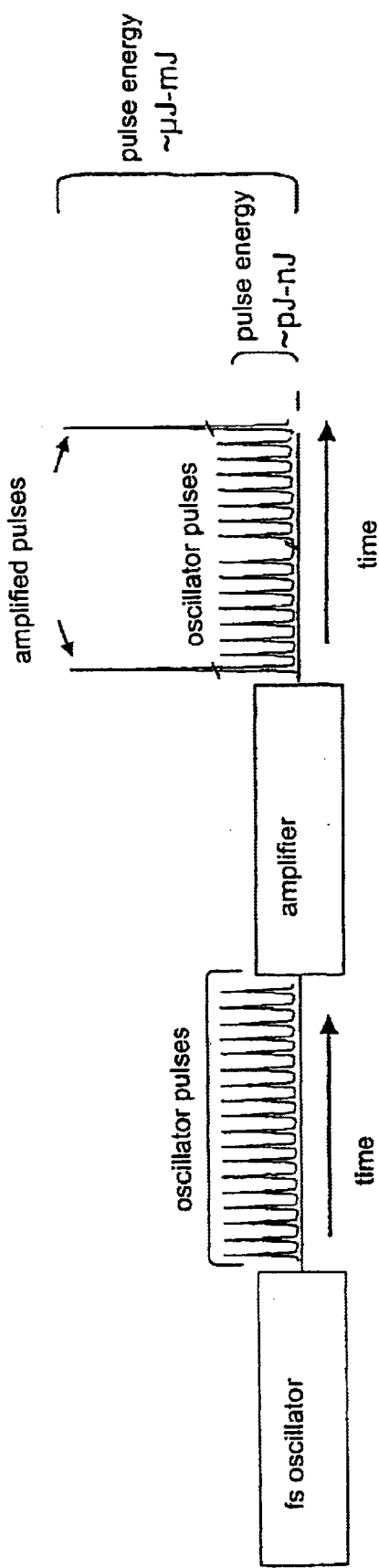

The mode of operation of an fs laser system with regenerative amplifier suitable for use in the device according to the invention is shown in FIG. 2.

A sequence of ultrashort (first) laser pulses of low energy (oscillator pulses) is generated in an fs oscillator. The energy of these pulses is not suitable for material machining; their repetition rate is in the MHz range.

High amplification of the energy is therefore carried out in a downstream regenerative amplifier. Since the power of the amplifier is limited, during this operation individual pulses are extracted in a defined manner from the sequence of first laser pulses and amplified. The repetition rate of the amplified (second) pulses is in the kHz range.

Both non-amplified (first) laser pulses and amplified (second) laser pulses issue from the amplifier.

The fs oscillator and amplifier structural elements shown in FIG. 2 correspond to the fs oscillator 1 and amplifier 2 structural elements in FIG. 1.

What is claimed is:

1. A device for machining a material with ultrashort laser pulses, comprising:
   (a) a device (1) for generating a sequence of first laser pulses, wherein
      the first laser pulses each have a duration of less than 300 picoseconds and
      the repetition rate for the first laser pulses is in the range between 100 kHz and 1 GHz,
   (b) a converter (2) for converting a first set of the sequence of first laser pulses into a sequence of second laser pulses for application to and for machining of the material, wherein
      the second laser pulses each have a duration of less than 300 picoseconds and
      the repetition rate for the second laser pulses is in the range between 1 Hz and 1 MHz,
   as well as
   (c) a testing device (3, 5, 6, 7, 15) that is equipped to apply first laser pulses, which do not belong to the first set, to the material, to detect specific results of this application and to provide these detected results as information.

2. The device according to claim 1, wherein the testing device
   comprises a detector (6) that provides the information as a response to radiation back-scattered and/or reflected by the material.

3. The device according to claim 1, further comprising:
   (d) a control and/or regulating device (9), which
      interacts both with the testing device (3, 5, 6, 7, 15) and with the converter (2),
      information being transmitted from the testing device (3, 5, 6, 7, 15) to the control and/or regulating device (9) and
      the control and/or regulating device (9) controlling or regulating the conversion of first laser pulses into second laser pulses and/or the application of the second laser pulses to the material as a function of this information.

4. The device according to claim 1, wherein the converter comprises a selective pulse amplifier (2).

5. The device according to claim 4, wherein the first and second laser pulses issue from the selective pulse amplifier (2), which first and second laser pulses are separated by means of a beam divider (3) into two beams in such a way that one of the beams can be used for material machining.

6. The device according to claim 1, wherein the testing device is equipped for carrying out interferometric analyses.

7. The device according to claim 2, wherein a pulse selector (7) is provided to prevent amplified laser pulses or their interference products impinging on the detector.

8. A method for machining a material with ultrashort laser pulses, having the following steps:
   (a) generation of a sequence of first laser pulses, where
      the first laser pulses each have a duration of less than 300 picoseconds and
      the repetition rate for the first laser pulses is in the range between 100 kHz and 1 GHz,
   (b) conversion of a set of first laser pulses into a sequence of second laser pulses for machining the material, where
      the second laser pulses each have a duration of less than 300 picoseconds and
      the pulse repetition rate is in the range between 1 Hz and 1 MHz,
   (c) application of a sequence of selected second laser pulses to the material in order to machine this, and
   (d) application of a second set of first laser pulses to the material in order to test this.

9. A method for machining, comprising:
   preparing a device comprising:
      a device (1) for generating a sequence of first laser pulses, where
         the first laser pulses each have a duration of less than 300 picoseconds and
         the repetition rate for the first laser pulses is in the range between 100 kHz and 1 GHz,
      a converter (2) for converting the first set of the sequence of first laser pulses into a sequence of second laser pulses for application to and for machining of the material, where
         the second laser pulses each have a duration of less than 300 picoseconds and
         the repetition rate for the second laser pulses is in the range between 1 Hz and 1 Mhz,
      as well as
      a testing device (3, 5, 6, 7, 15) that is equipped to apply first laser pulses, which do not belong to the first set, to the material, to detect specific results of this application and to provide these detected results as information, and
   using said device to
   (a) generate a sequence of first laser pulses, where
      the first laser pulses each have a duration of less than 300 picoseconds and
      the repetition rate for the first laser pulses is in the range between 100 kHz and 1 GHz,
   (b) convert a set of first laser pulses into a sequence of second laser pulses for machining the material, where
      the second laser pulses each have a duration of less than 300 picoseconds and
      the pulse repetition rate is in the range between 1 Hz and 1 MHz,
   (c) apply a sequence of selected second laser pulses to the material in order to machine this, and
   (d) apply a second set of first laser pulses to the material in order to test this.

* * * * *